United States Patent
Hall et al.

(10) Patent No.: US 11,884,042 B2
(45) Date of Patent: Jan. 30, 2024

(54) SECURELY CODED WRAPPING

(71) Applicant: Hall Labs LLC, Provo, UT (US)

(72) Inventors: David R. Hall, Provo, UT (US); Jared Eggett, Lehi, UT (US); David Brent Noel, Orem, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 17/146,433

(22) Filed: Jan. 11, 2021

(65) Prior Publication Data
US 2022/0219433 A1 Jul. 14, 2022

(51) Int. Cl.
*B32B 27/08* (2006.01)
*B65B 11/02* (2006.01)
*B65B 11/18* (2006.01)

(52) U.S. Cl.
CPC ............ *B32B 27/08* (2013.01); *B65B 11/025* (2013.01); *B65B 11/18* (2013.01); *B32B 2307/41* (2013.01)

(58) Field of Classification Search
CPC ... B32B 27/08; B32B 2307/41; B65B 11/025; B65B 11/18
See application file for complete search history.

(56) References Cited

U.S. PATENT DOCUMENTS

| | | | | |
|---|---|---|---|---|
| 4,355,496 A | * | 10/1982 | Teates | B65B 11/04 100/15 |
| 5,463,842 A | * | 11/1995 | Lancaster | B65H 20/34 53/399 |
| 6,393,808 B1 | * | 5/2002 | Kallner | B65C 1/025 53/135.3 |
| 2007/0022294 A1 | * | 1/2007 | Lapstun | G06F 16/9554 713/176 |
| 2010/0163443 A1 | * | 7/2010 | Storig | B65B 57/04 53/461 |
| 2020/0239189 A1 | * | 7/2020 | Labonski | B65D 25/205 |

FOREIGN PATENT DOCUMENTS

CN 105540034 A * 5/2016 ............. B65B 53/02

* cited by examiner

*Primary Examiner* — Thomas M Wittenschlaeger

(57) ABSTRACT

Systems and methods for securely identifying an item are disclosed. The method includes receiving an item, selecting a plastic wrap that is opaque and that includes a random pattern of markings, and wrapping the item with the plastic wrap, which protects the protects the item frons visual inspection with the opaque plastic and that secures the item with a unique fingerprint/code formed from the random pattern of markings.

18 Claims, 3 Drawing Sheets

SECURELY CODED WRAPPING

CROSS-REFERENCE TO RELATED APPLICATIONS

The present application for patent claims priority to U.S. Provisional Application No. 62/959,341, filed Jan. 10, 2020, which is assigned to the assignee of the present application and hereby expressly incorporated by reference

TECHNICAL FIELD

The described systems, devices and methods are directed to tracking items and properties of items.

BACKGROUND

It is estimated that 1.2-3% of all goods are lost to shrinkage (e.g., inventory shrinkage, shrink). Shrinkage generally refers to the loss of goods between manufacture and sale. In today's global economy, shrinkage has huge economic impacts and represents billions of dollars of loss annually. Shrinkage is primarily caused by theft (e.g., employee theft, shoplifting). Accordingly, solutions are needed to reduce shrinkage.

SUMMARY

In a first aspect, the disclosure describes a method for securely identify an item. The method includes receiving an item; selecting a plastic wrap, wherein the plastic wrap is opaque, and wherein the plastic wrap includes a random marking; and wrapping the item with the plastic wrap, wherein the random marking forms a unique fingerprint on the item.

In a second aspect, the disclosure provides that the unique fingerprint is on one side of the item.

In a third aspect, the disclosure provides that the random marking forms a set of unique fingerprints, with one unique fingerprint on each side of the item.

In a fourth aspect, the disclosure provides that each unique fingerprint in the set of unique fingerprints is unique with respect to all other unique fingerprints in the set of unique fingerprints.

In a fifth aspect, the disclosure provides that wrapping the item with the plastic wrap includes wrapping the item with the plastic wrap at a first angle.

In a sixth aspect, the disclosure provides that the method further includes adjusting the first angle to the second angle; and wrapping the item with the plastic wrap at the second angle, wherein the second angle is different from the first angle.

In a seventh aspect, the disclosure provides that the method includes adjusting the second angle to a third angle; and wrapping the item with the plastic wrap at the third angle, wherein the third angle is different from the second angle.

In a eighth aspect, the disclosure provides that wrapping the item with the plastic wrap includes wrapping a top of the item.

In a ninth aspect, the disclosure provides that the random marking forms a unique fingerprint on the top of the item.

In a tenth aspect, the disclosure provides that at least a portion of the random marking has a known size.

In an eleventh aspect, the disclosure describes a device for securely identifying an item. The device includes a platform that supports an item, plastic wrap, wherein the plastic wrap is opaque, and wherein the plastic wrap includes a random marking; a plastic wrapping mechanism, wherein the plastic wrapping mechanism directs the application of the plastic wrap on the item to wrap the item, wherein the plastic wrapping mechanism wraps the item with the plastic wrap forms a unique fingerprint on the item; and an actuator, that actuates at least one of the platform and the plastic wrapping mechanism.

In a twelfth aspect, the disclosure describes that the unique fingerprint is on one side of the item.

In a thirteenth aspect, the disclosure provides that the random marking forms a set of unique fingerprints, with one unique fingerprint on each side of the item.

In a fourteenth aspect, the disclosure provides that each unique fingerprint in the set of unique fingerprints is unique with respect to all other unique fingerprints in the set of unique fingerprints.

In a fifteenth aspect, the disclosure provides that the plastic wrapping mechanism wraps the item with the plastic wrap at a first angle.

In a sixteenth aspect, the disclosure provides that the plastic wrapping mechanism: adjusts the first angle to a second angle; and wraps the item with the plastic wrap at the second angle, wherein the second angle is different from the first angle.

In a seventeenth aspect, the disclosure provides that the plastic wrapping mechanism: adjusts the second angle to a third angle; and wraps the item with the plastic wrap at the third angle, wherein the third angle is different from the second angle.

In an eighteenth aspect, the disclosure provides that the plastic wrapping mechanism wraps a top of the item.

In a nineteenth aspect, the disclosure provides that the random marking forms a unique fingerprint on the top of the item.

In a twentieth aspect, the disclosure provides that at least a portion of the random marking has a known size.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed systems, devices, and methods and are not intended to show every potential feature or embodiment of the claimed systems, devices, and methods. The drawings are not necessarily drawn to scale; in some instances certain elements of the drawing may be enlarged with respect to other elements of the drawing for purposes of illustration.

DETAILED DESCRIPTION

Figure 1:
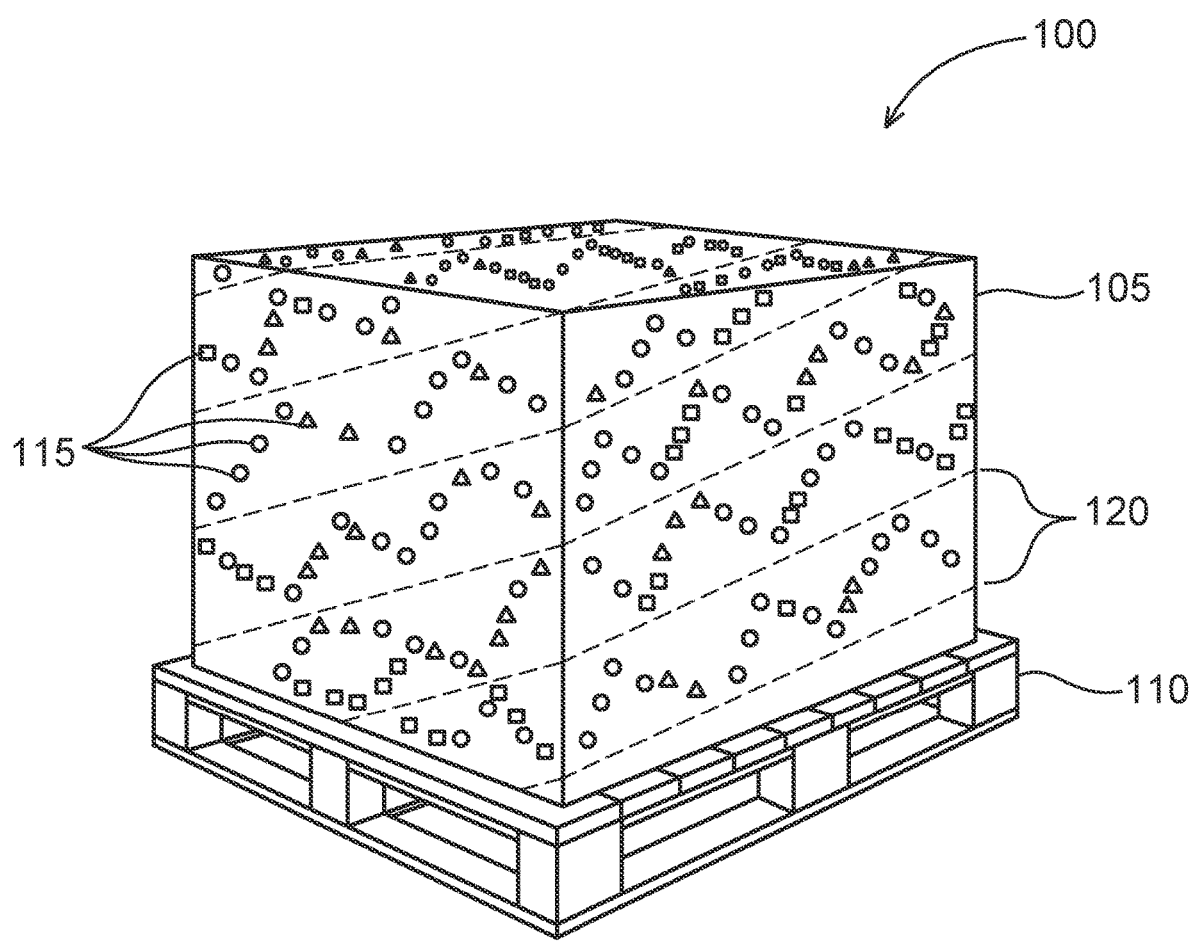
FIG. 1 is a perspective diagram that illustrates an exemplary embodiment of how the described systems and methods may be used to label and secure a pallet.

The following description recites various aspects and embodiments of the systems, devices, and methods disclosed herein. No particular embodiment is intended to define the scope of the described systems, devices, and methods. Rather, the embodiments provide non-limiting examples of various compositions, and methods that are included within the scope of the claimed systems, devices, and methods. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances it is understood that any term in the singular may include its plural counterpart and vice versa, unless expressly indicated to the contrary.

As used herein, the singular forms "a," "an", and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As noted above, shrinkage is a substantial problem. Shrinkage is due to multiple factors. The largest factor is typically theft (e.g., employee theft, shoplifting). Whether by an employee (that has access to the inventory, for example) or a non-employee (that has access to the inventory, for example), in the case of theft, goods literally disappear (i.e., are stolen) prior to sale. It is anticipated that a large portion of theft is driven because high value items are clearly visible (by being wrapped with clear plastic which allows the underlying items to be easily visible or by labels that explicitly identify the contents of a box or pallet, for example). Accordingly, there is a need to protect against theft (reduce and/or eliminate shrinkage, for example) while still enabling proper tracking of items.

It is appreciated that most tracking systems utilize some sort of labeling/marking (e.g., barcodes, OR codes, and the like) system, which is used to electronically track items. Since both labels and packaging factor into the shrinkage problem, the described systems and methods address both packaging and labeling.

In the context of warehousing, the item to be protected is often a pallet. It is understood, however, that the described systems and methods can be applied to any item, such as boxes or the product itself. With this in mind, often a pallet of goods may be received from a first entity (that does not utilize the described systems and methods, for example). At the unloading dock, the pallet may be wrapped in clear plastic and may be affixed with a first label (e.g., a barcode, matrix barcode, Quick Response (OR) code, radio frequency identification (RFID), or the like) that identifies the goods. In this present state, the pallet may be an easy target for theft in view of the clear plastic wrapping and/or the (presumed to be explicitly descriptive) labeling.

Traditional plastic wrapping is performed using clear plastic, which allows visual verification of the internal contents of the item. When tracking is human-based, this visualization is required. However, as suggested above, this visualization also invites theft (particularly for valuable items, for example). As described herein, the described systems and methods may utilize black (or dark colored, for example) plastic wrapping that hides the contents of the item. Black wrapping in addition to machine readable labels (e.g., a bar code, OR code, that does not contain human readable text or images, for example) may anonymize items to persons (e.g., humans) while allowing cameras and machines with the proper access to easily keep track of the items—thus reducing shrinkage.

In some cases, the label may not be a sticker or any additional mark added to the item but may be created dynamically during the plastic wrapping option due to a computer-identifiable random pattern that is included (e.g., weaved) into the plastic (e.g., opaque plastic). For example, a package may be wrapped with an opaque white plastic that includes a randomized pattern of weaved in contrasting strands. The resulting pattern of randomized strands in the plastic packaging (post wrapping, for example) may serve as the label of the item.

It is appreciated that this approach may provide instantaneous labeling, that is completely unattainable or reproducible (or even recognizable, for example) by persons. Indeed, the random lattice parameter may create a nearly unlimited selection of unique fingerprints. Considering that width of the plastic may require multiple wraps around a given item, enhances the complexity of each fingerprint (making it easier for computer tracking, while making it harder for reproduction or understanding by persons, for example).

Turning now to the figures, FIG. 1 is a perspective diagram that illustrates an exemplary embodiment of how the described systems and methods may be used to label and secure a pallet 100. The pallet 100 includes a pallet platform 110 that is loaded with goods 105 (which are arranged (e.g., boxed) to form a cubic structure that matches the pallet platform 110 as shown, for example).

The pallet platform 110 is traditionally made of wood and provides a portable platform for moving, stacking, and storing items (e.g., goods 105). The pallet platform 110 includes a top deck and a bottom deck that are spaced apart (typically by a board as shown, for example) to form a pair of voids that are adapted to receive the forks of a forklift or a pallet jack.

The goods 105 may be boxed or otherwise packaged in a way that enables the goods 105 to be loaded onto the top deck of the pallet platform 110 and form at least a rough cubic structure (e.g., rectangular cubic structure), to maximize/optimize the loading potential of the pallet platform 110 while conforming to standardized/generally accepted size/weight constraints for pallets. Regardless of the type of goods 105, typically a pallet 100 includes a multiple instances of the goods 105, which are loaded or arranged on top of the pallet platform 110 to form the rough cubic structure (as shown).

After loading the pallet platform 110 with goods 105, the pallet is traditionally wrapped with plastic to keep the goods 105 in place and together as a single unit on the pallet platform 110 and to help secure the goods 105 to the pallet platform 110. As noted above, typically this plastic wrapping is done using clear plastic wrap.

It is appreciated that the plastic wrapping process may be completed by wrapping plastic around a pallet 100 through either moving the plastic around the pallet 100 or by rotating the pallet 100 while the plastic is being applied from a single area. Often the plastic is wrapped around multiple times in a at least partially overlapping pattern to ensure that the pallet 100 the is completely wrapped on all sides (and often covered on top as well).

The described systems and methods may be used to label and secure a pallet 100 that is being plastic wrapped for the first time (e.g., as part of the initial pallet 100 creation) or to provide an additional plastic wrap on a pallet 100 that is already wrapped with (clear, for example) plastic (e.g., in the case that a pallet 100 is received from a third party that doesn't utilize the described systems and methods).

As described herein, instead of using clear plastic, opaque or otherwise non-transparent plastic (e.g., black plastic) may be used to protect the goods 105 in a visually impenetrable coating. In addition to being opaque, the plastic wrap may be weaved, marked, or printed with a random pattern (using a random arrangement of marks 115 (e.g., shapes 115), for example). This random pattern in combination with the inherent randomness associated with the plastic wrapping process, results in a unique fingerprint on each side face and optionally the top) of the pallet 100. For example, the width 120 of the plastic wrap may be smaller than the height of the goods 105 so that the plastic must be wrapped at an angle to ensure complete coverage. This, combination of the random pattern in the plastic itself and the angle and randomness associated with the wrapping process further ensures that each face will have a unique pattern (e.g., a unique fingerprint).

At least one of the marks 115 may be of a known size. Having at least one mark 115 of a known size allows the area in proximity (e.g., on that side of the item) to the mark 115 with known size to be properly scaled and relational position of the various marks be accurately identified so that the fingerprint/code may be properly determined. Because of the random pattern of the marks 115 and the variations in how the plastic is wrapped on the item, each face (e.g., side) of the item will have a unique fingerprint.

It is appreciated that each face of the pallet 100 will inherently have a unique fingerprint. Thus, the pallet 100 inherently includes at least four (i.e., for the four sides) and possibly five (if the top wrapped as well, for example) unique fingerprints or codes. Each of these unique fingerprints/codes may be stored in the tracking system as referencing this same item (i.e., the pallet 100).

The described features herein may be used in combination with digital capture devices (e.g., cameras) and/or virtual/augmented/mixed reality glasses to improve and enhance workflows. As noted above, virtual/augmented/mixed reality glasses may be equipped with one or more cameras that provide images that can be analyzed to monitor items, monitor locations, update locations, etc. In some embodiments the virtual reality system may use the cameras and the resulting information that comes from a viewed label to enhance or augment a job. Alternatively, digital content may be dynamically displayed on a device (e.g., display, monitor, mobile device phone, tablet, etc.)

In the case of a warehouse, items (e.g., pallets, boxes, bins, sacks, etc. are moved around using equipment (e.g., a forklift, pallet jack, conveyor, etc.) and in the process may be identified from any side (or the top of the item, for example). This is beneficial in that the pallet may be identified (using cameras, for example) from any angle using the described systems and methods.

As noted previously, typically, pallets are wrapped with plastic as a final step of palletization. Other items (other than pallets, for example) may similarly be wrapped with plastic for protection during warehousing and shipment to an end consumer.

Regardless of the item, the plastic operation includes a rotation of the item and/or a rotation of the plastic wrapping equipment around the item. In some embodiments, the plastic wrapping equipment may include one or more imaging devices (e.g., camera, lidar, etc.) that capture/determines the unique fingerprint for each side (and the top, for example) of the item.

While the initial plastic wrapping operation provides an ideal situation for initially capturing the unique fingerprint of each side of the item, it is appreciated that the unique fingerprint may be determined through the natural flow of the item through the warehousing system. For example, it is appreciated that the images from multiple angles may come from one camera that captures multiple images as the item moves (e.g., changes perspective in the frame of the image) or may come from multiple cameras at different angles.

In some embodiments, the unique fingerprint(s) of an item may be obtained based on a camera located on a user or a fork truck that is passing by the item. Doing a fingerprint check periodically as cameras pass by may catch damage and or theft (e.g., by a person taking something from a pallet) automatically as cameras pass by the item. In such situations, one or more sides of the pallet may have the proper fingerprint, while another side (or sides) may be an unknown pattern due to a disturbance (e.g., ripping open) of the plastic wrapping of one or two sides (e.g., a corner of the item). In this way, even if part of the plastic wrapping is disturbed, the item may still be identified from one or more of the other sides that includes a readable fingerprint.

In some embodiments, because of the extremely high code set created by the randomized pattern and the variance in wrapping systems, even partial fingerprints may (as in the case if the plastic wrapping is removed or destroyed in a certain area of a side, for example) uniquely identify the item, even with just a partial fingerprint. Between the availability of partial fingerprints or other fingerprints from other sides the described systems and methods make it extremely difficult to remove the ability to identify the item.

By using passive cameras and with the ability to identify the item from any side may allow for all of the tracking data to be collected without any interaction of personnel (the tracking occurs passively with respect to persons, for example). The system and devices described herein therefore enable easy identification while mitigating the risk of shrinkage.

Figure 2:
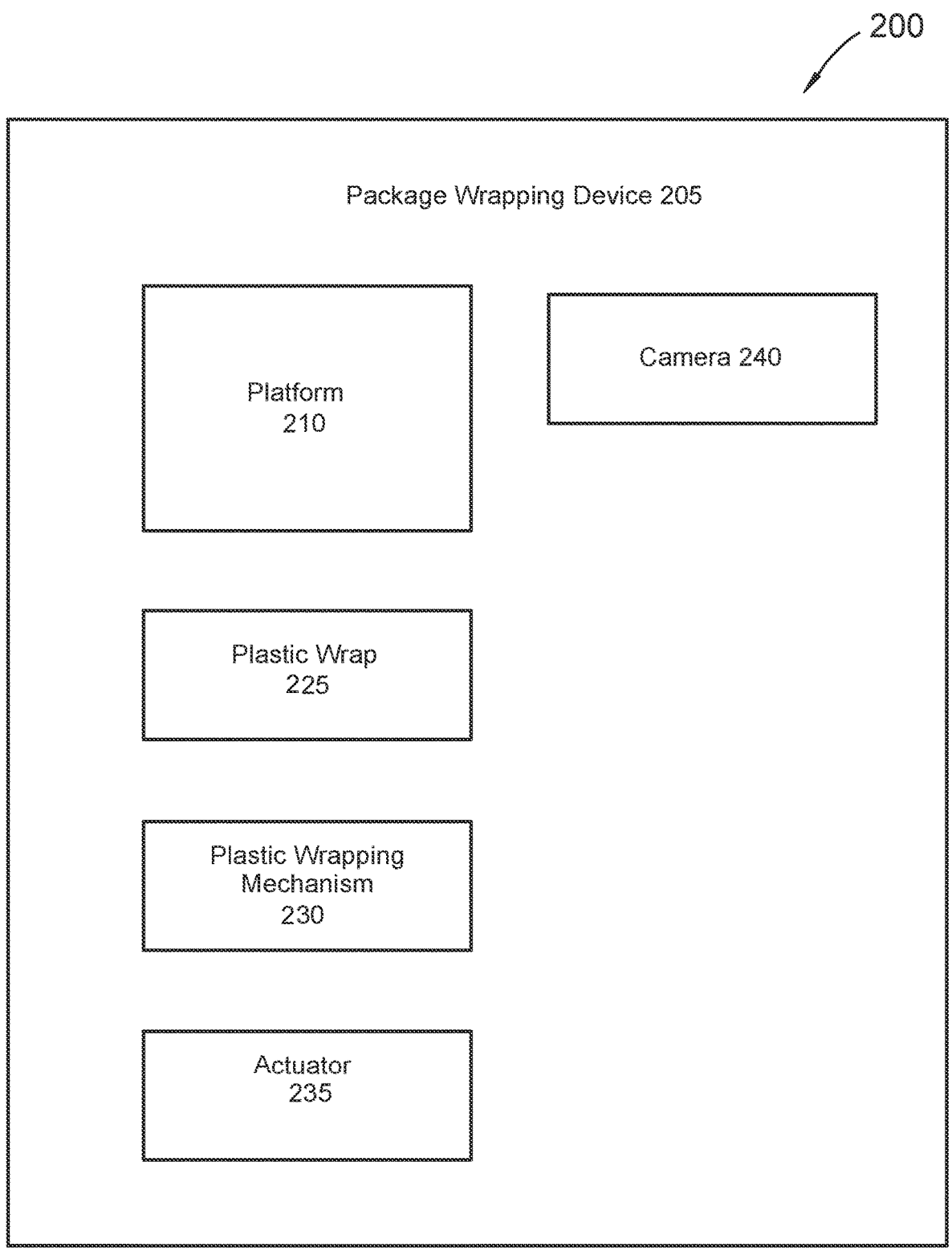
FIG. 2 is a block diagram of a package wrapping device for implementing the described systems and methods.

FIG. 2 is a block diagram of a plastic wrapping device 200 for implementing the described systems and methods. In some embodiments, the plastic wrapping device 200 described herein (that implements the various algorithms described herein, for example) may be examples of the plastic wrapping 205.

The plastic wrapping device 205 includes a platform 210 for holding an item, plastic wrap 225 that includes a plurality of random marks, a plastic wrapping mechanism 230 that feeds the plastic wrap applies the plastic wrap to the item, and an actuator 235 that rotates either the platform 210 or the plastic wrapping mechanism 230 that enables the wrapping of the plastic wrap on the item including the angles and pattern in which the item is wrapped. The plastic wrapping device 205 may additionally include a camera 240 for capturing images of an item getting wrapped (during wrapping and/or after wrapping), which provides an initial determination of the fingerprint/code that was created as a result of the random marks being wrapped around the item.

Figure 3:
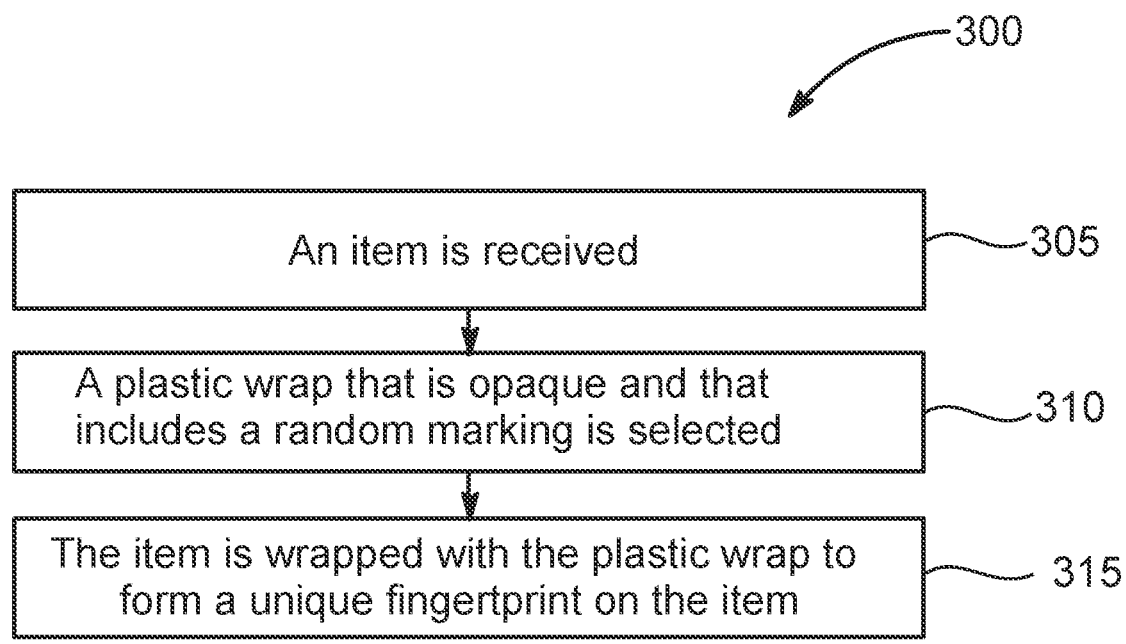
FIG. 3 is a flow diagram illustrating one example of a method for securely identifying an item.

FIG. 3 is a flow diagram illustrating one example of a method 300 for securely identifying an item. The method 300 may be implemented by a plastic wrapping device 205 or an application specific processor (e.g., processor and memory) included within a device.

At 305, an item is received. At 310, a plastic wrap that is opaque and that includes a random marking is selected. At 315, the item is wrapped with the plastic wrap. It is appreciated that wrapping the item with the plastic wrap results in the random marking forming a unique fingerprint on the item.

The systems, devices, and methods described herein have been described with reference to various specific and preferred embodiments and techniques. Nevertheless, it is understood that many variations and modifications may be made while remaining within the spirit and scope of the describes systems, devices, and methods.

What is claimed is:

1. A method for securely identifying an item, comprising:
   receiving an item, wherein the item has a first face and a second face;
   selecting a plastic wrap, wherein the plastic wrap includes a plurality of random markings;
   wrapping the item a first time with the plastic wrap to provide a first wrap on the item, wherein the first wrap covers a first portion of the first face of the item and a third portion of the second face of the item; and
   wrapping the item a second time with the plastic wrap to provide a second wrap on the item, wherein the second wrap covers a second portion of the first face of the item and a fourth portion of the second face of the item, wherein the first portion of the first face of the item and the second portion of the first face of the item are different, wherein the third portion of the second face of the item and the fourth portion of the second face of the item are different, wherein the plurality of random markings in the plastic wrap of the first wrap in combination with the plurality of random markings in the plastic wrap of the second wrap forms a first unique fingerprint on the first face of the item and a second unique fingerprint on the second face of the item, and wherein the first unique fingerprint and the second unique fingerprint are different.

2. The method of claim 1, wherein the plurality of random markings in the plastic wrap in combination with the wrapping of the item with the plastic wrap forms a set of unique fingerprints, with one unique fingerprint on each face of the item.

3. The method of claim 2, wherein each unique fingerprint in the set of unique fingerprints is unique with respect to all other unique fingerprints in the set of unique fingerprints.

4. The method of claim 1, wherein wrapping the item the first time with the plastic wrap comprises wrapping the item with the plastic wrap at a first angle.

5. The method of claim 4, further comprising:
   adjusting the first angle to a second angle, wherein wrapping the item the second time with the plastic wrap comprises
   wrapping the item with the plastic wrap at the second angle, wherein the second angle is different from the first angle.

6. The method of claim 5, further comprising:
   adjusting the second angle to a third angle; and
   wrapping the item with the plastic wrap at the third angle, wherein the third angle is different from the second angle.

7. The method of claim 1, wherein wrapping the item with the plastic wrap comprises wrapping a top of the item.

8. The method of claim 7, wherein the plurality of random markings in the plastic wrap in combination with the wrapping of the item with the plastic wrap forms a unique fingerprint on the top of the item.

9. The method of claim 1, wherein at least one of the plurality of random markings in the plastic wrap has a known size, and wherein the plastic wrap is opaque.

10. A device for securely identifying an item, comprising:
    a platform that supports an item, wherein the item has a first face and a second face,
    plastic wrap, wherein the plastic wrap includes a plurality of random markings;
    a plastic wrapping mechanism, wherein the plastic wrapping mechanism directs the application of the plastic wrap on the item to wrap the item, wherein the plastic wrapping mechanism:
      wraps the item a first time with the plastic wrap to provide a first wrap on the item, wherein the first wrap covers a first portion of the first face of the item and a third portion of the second face of the item, and
      wraps the item a second time with the plastic wrap to provide a second wrap on the item, wherein the second wrap covers a second portion of the first face of the item and a fourth portion of the second face of the item, wherein the first portion of the first face of the item and the second portion of the first face of the item are different, wherein the third portion of the second face of the item and the fourth portion of the second face of the item are different wherein the plurality of random markings in the plastic wrap of the first wrap in combination with the plurality of random markings in the plastic wrap of the second wrap forms a first unique fingerprint on the first face of the item and a second unique fingerprint on the second face of the item, and wherein the first unique fingerprint and the second unique fingerprint are different; and
    an actuator, that actuates at least one of the platform and the plastic wrapping mechanism.

11. The device of claim 10, wherein the plurality of random markings in the plastic wrap in combination with the wrapping of the item with the plastic wrap forms a set of unique fingerprints, with one unique fingerprint on each face of the item.

12. The device of claim 11, wherein each unique fingerprint in the set of unique fingerprints is unique with respect to all other unique fingerprints in the set of unique fingerprints.

13. The device of claim 1, wherein the plastic wrapping mechanism wraps the item the first time with the plastic wrap at a first angle.

14. The device of claim 13, wherein the plastic wrapping mechanism:
    adjusts the first angle to a second angle, wherein the plastic wrapping mechanism wraps the item the second time with the plastic wrap
    at the second angle, wherein the second angle is different from the first angle.

15. The device of claim 14, wherein the plastic wrapping mechanism:
    adjusts the second angle to a third angle; and
    wraps the item with the plastic wrap at the third angle, wherein the third angle is different from the second angle.

16. The device of claim 10, wherein the plastic wrapping mechanism wraps a top of the item.

17. The device of claim 16, wherein the plurality of random markings in the plastic wrap in combination with the wrapping of the item with the plastic wrap forms a unique fingerprint on the top of the item.

18. The device of claim 10, wherein at least one of the plurality of random markings in the plastic wrap has a known size, and wherein the plastic wrap is opaque.

\* \* \* \* \*